(12) United States Patent
Zimmerman

(10) Patent No.: US 12,106,505 B2
(45) Date of Patent: Oct. 1, 2024

(54) REFLECTION-BASED DISTANCE PERCEPTION

(71) Applicant: International Business Machines Corporation, Armonk, NY (US)

(72) Inventor: Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 17/010,102

(22) Filed: Sep. 2, 2020

(65) Prior Publication Data

US 2022/0067953 A1 Mar. 3, 2022

(51) Int. Cl.
*G01B 11/02* (2006.01)
*G01C 3/08* (2006.01)
*G06T 7/62* (2017.01)

(52) U.S. Cl.
CPC .............. *G06T 7/62* (2017.01); *G01B 11/022* (2013.01); *G01C 3/08* (2013.01); *G01B 11/026* (2013.01)

(58) Field of Classification Search
CPC . G06T 2207/10016; G06T 2207/20081; G06T 7/20; G06T 1/0007; G06V 10/82; G06V 10/764; G06V 20/69; G06V 20/40; G06V 10/806; G06V 20/693; G06V 10/10
See application file for complete search history.

(56) References Cited

U.S. PATENT DOCUMENTS

| | | | |
|---|---|---|---|
| 5,084,776 A * | 1/1992 | Watson | G03H 1/22 359/9 |
| 5,422,712 A * | 6/1995 | Ogino | G01N 15/1463 356/417 |
| 6,091,075 A | 7/2000 | Shibata et al. | |
| 7,929,132 B2 | 4/2011 | Lupton et al. | |
| 8,103,331 B2 | 1/2012 | Hoyt et al. | |
| 8,446,667 B2 | 5/2013 | Smith et al. | |
| 9,784,568 B2 | 10/2017 | Laguarta Bertran et al. | |
| 2002/0030812 A1 * | 3/2002 | Ortyn | G02B 27/145 356/73 |
| 2003/0137580 A1 * | 7/2003 | Sumi | H04N 1/00034 347/243 |
| 2003/0142398 A1 * | 7/2003 | Leblans | G02B 21/244 250/201.3 |

(Continued)

FOREIGN PATENT DOCUMENTS

| | | | |
|---|---|---|---|
| CN | 102981681 A | | 3/2013 |
| CN | 109981929 A | * | 7/2019 |
| KR | 20200041079 A | * | 10/2018 |

OTHER PUBLICATIONS

Graham et al., The application of holography to the analysis of size and settling velocity of suspended cohesive sediments, Limnol. Oceanogr.: Methods 8, 2010, 1-15, 2010, by the American Society of Limnology and Oceanography, Inc.*

(Continued)

*Primary Examiner* — Guillermo M Rivera-Martinez
(74) *Attorney, Agent, or Firm* — Peter J. Edwards (57) ABSTRACT

A single camera can be used to determine a height of an object. The camera captures an image of the object against a reflective surface backdrop. The distance from the camera and the reflective surface, combined with the distance between the object and the reflection of the object, can be used to determine the distance from the object and the reflective surface.

15 Claims, 6 Drawing Sheets

(56) References Cited

U.S. PATENT DOCUMENTS

| | | | | |
|---|---|---|---|---|
| 2005/0213090 | A1* | 9/2005 | Namba | G01N 21/6408 |
| | | | | 356/318 |
| 2010/0010773 | A1 | 1/2010 | Lin et al. | |
| 2011/0007386 | A1* | 1/2011 | Lupton | G02B 21/086 |
| | | | | 359/385 |
| 2011/0211059 | A1* | 9/2011 | Smith | G02B 21/0008 |
| | | | | 348/79 |
| 2013/0027540 | A1* | 1/2013 | Ito | G01N 15/1463 |
| | | | | 348/79 |
| 2014/0178865 | A1 | 6/2014 | Reed et al. | |
| 2016/0379376 | A1* | 12/2016 | Milne | G06T 7/246 |
| | | | | 348/135 |
| 2017/0293217 | A1* | 10/2017 | Gallager | G02B 27/0006 |
| 2018/0100793 | A1* | 4/2018 | Ichiki | G01N 15/1429 |
| 2019/0293565 | A1* | 9/2019 | Gallager | G01N 21/8507 |
| 2019/0294107 | A1* | 9/2019 | Kondo | G03H 1/0005 |
| 2020/0087611 | A1* | 3/2020 | He | C12M 1/3446 |
| 2020/0124516 | A1* | 4/2020 | Vidal | G06T 7/20 |

OTHER PUBLICATIONS

Lasley-Rasher et al., "Intoxicated copepods: ingesting toxic phytoplankton leads to risky behaviour," The Royal Society Publishing, Proceedings B, Accepted Apr. 1, 2016, 9 pages http://rspb.royalsocietypublishing.org/content/royprsb/283/1829/20160176.full.pdf.

Augusiak et al., "The influence of insecticide exposure and environmental stimuli on the movement behaviour and dispersal of a freshwater isopod," Springer, Ecotoxicology, Jun. 15, 2016, 15 pages, DOI 10.1007/s10646-016-1686-y, https://www.ncbi.nlm.nih.gov/pmc/articles/PMC4961728/.

Taute et al., "High-throughput 3D tracking of bacteria on a standard phase contrast microscope," Nature Communications, Published Nov. 2, 2015, 9 pages, DOI: 10.1038/ncomms9776 https://www.nature.com/articles/ncomms9776.

Schuech et al., "Going ballistic in the plankton: Anisotropic swimming behavior of marine protists," ASLO, Limnology and Oceanography: Fluids and Environments, Apr. 10, 2014, 32 pages http://onlinelibrary.wiley.com/doi/10.1215/21573689-2647998/full.

* cited by examiner

REFLECTION-BASED DISTANCE PERCEPTION

This invention was made with government support under National Science Foundation (NSF) Award #1548297, awarded by the NSF. The government has certain rights to this invention.

BACKGROUND

Plankton and other aquatic organisms can, when viewed under a microscope, be observed swimming in three dimensions, revealing behavior like feeding, mating, exploration and sleep. Observing plankton movement is particularly important because disturbances in normal plankton predatory-prey behavior have been implicated as a factor in the production of harmful algal blooms.

SUMMARY

Some embodiments of the present disclosure can be illustrated as a method. The method includes receiving an image from an image capture device. The method further includes identifying first and second entities in the image. The method further includes determining that the second entity is a reflection of the first entity. The method further includes determining (based on the image) an apparent distance between the first entity and the second entity. The method further includes determining a distance of the first entity from a reflective surface, based on the apparent distance and a distance of the image capture device from the reflective surface.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to determine a three-dimensional position of an object using a single image capture device and a reflective surface. More particular aspects relate to a system configured to capture an image, detect an object in the image, detect a reflection of the object, determine two-dimensional positions of the object and its reflection, and determine a three-dimensional position of the object.

The systems and methods consistent with the present disclosure advantageously enable monitoring of a position of an object in three dimensions with a single image capture device. For example, in some embodiments, the image capture device may be a microscope, enabling monitoring of movement of a plankton in a microscope slide (including movement in the "Z-direction," where the Z-axis is defined as the axis between the microscope and the slide). This may be accomplished utilizing stereoscopic microscopes, which include at least two image capture devices. These function by taking advantage of the depth perception enabled via binocular vision, as utilized by many animals (including humans). However, stereoscopic microscopes are generally more expensive and complex to calibrate and operate than microscopes with a single image capture device.

In essence, depth perception based on visual data requires more than a single image of the object. Binocular (stereoscopic) vision accomplishes this with two image sources, such as two eyes, two optical paths in a microscope, etc., creating a pair of images separated by a distance encoding depth. This principle is called binocular disparity. In contrast, the systems and methods of the present disclosure utilize only a single image source, but still obtain two images of an object: the "actual" image of the object itself, as well as a reflection of the object from a reflective surface. So long as some of the surrounding parameters (distance from the image capture device to the reflective surface, angle of the reflective surface, distance from the reflection to the central axis of the image capture device, etc.) are known, the three-dimensional position of the object can be calculated. This enables higher-level monitoring of objects with simpler image capture systems, such as 3D-monitoring of microorganisms with a microscope with a single image capture system. Additional benefits include enabling automated focusing based on the 3D position of an object as well as composite image generation of the object (as the reflection shows the "underside" of the object).

While reference is made to "microscopes" throughout this disclosure, the systems and methods consistent with this disclosure may be modified to serve other applications as well, as would be understood by one of ordinary skill in the art. For example, instead of a microscope used to observe microorganisms on a microscope slide, the present disclosure can also enable a camera used to observe fish within an aquarium or people swimming in a pool, etc.

Figure 1:
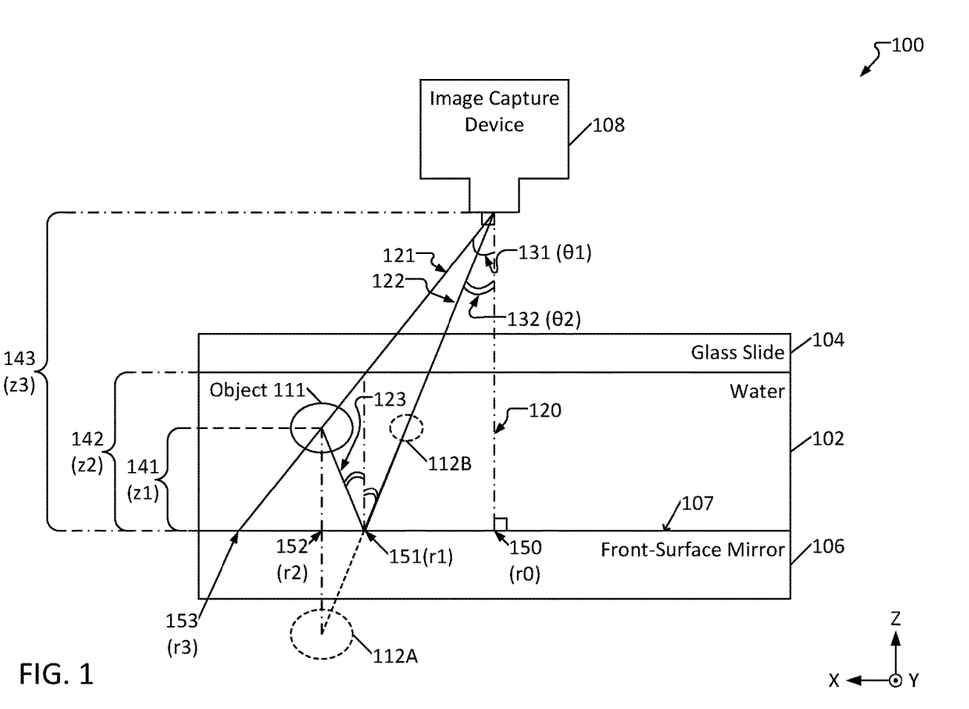
FIG. 1 is a conceptual diagram illustrating a reflective image capture system utilizing a first-surface mirror, consistent with several embodiments of the present disclosure.

FIG. 1 is a conceptual diagram illustrating a reflective image capture system 100, consistent with several embodiments of the present disclosure. System 100 includes an image capture device 108, a medium (such as a liquid, e.g., water) 102, a glass slide 104, and a first-surface mirror 106 (or "front-surface mirror," having a reflective surface 107). Image capture device 108 is disposed a distance z3 143 from the reflective surface 107 of mirror 106 as measured along axis 120 along which image capture device 108 captures images (e.g., such that a lens of image capture device 108 is at a ninety degree angle to axis 120). In some embodiments, image capture device 108 may comprise a microscope, though as mentioned above, this is for purposes of example only and is not intended to be limiting. Reflective surface 107 may be provided near medium 102. For example, a lower surface of medium 102 (minimum Z, parallel to X-Y plane) may be in contact with reflective surface 107. In some embodiments, medium 102 may be disposed such that the lower surface of medium 102 is a known nonzero distance from reflective surface 107 (such as a known distance along the camera axis). An example of this is discussed below with reference to FIG. 4.

As used herein, a medium may include a mass that extends laterally across some or all of a range of vision of image capture device 108 and is configured (whether via natural properties or man-man properties) to allow a majority of light traverse through the mass while refracting the light at a predictable rate. Common examples of media are water and air. In some embodiments, a vacuum may be utilized instead of one or more media.

Figure 3:
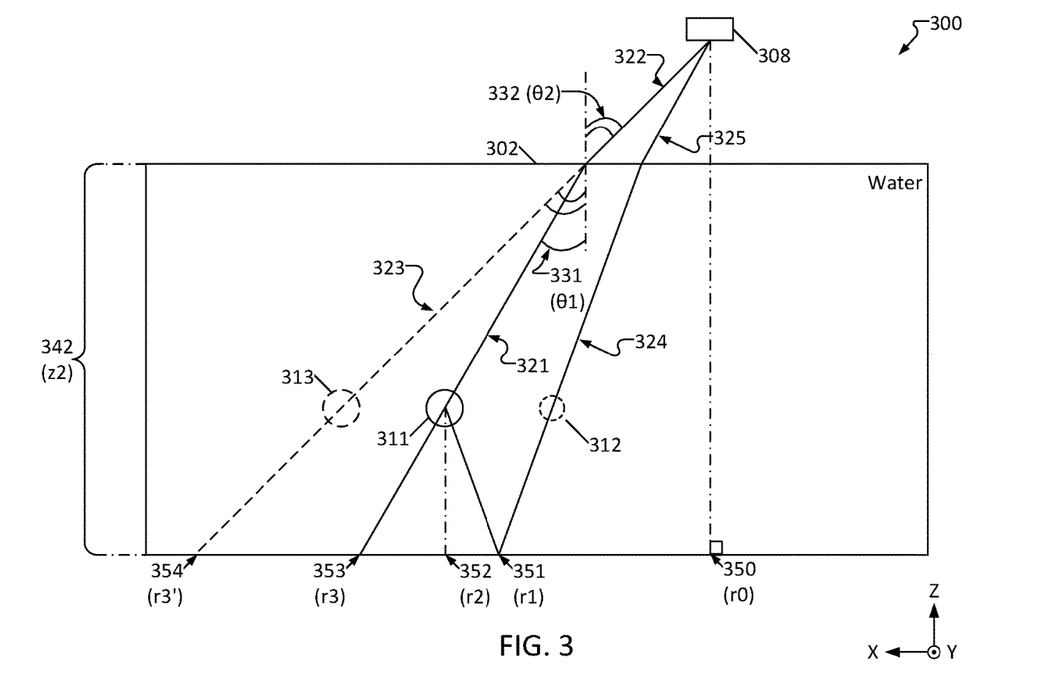
FIG. 3 is a conceptual diagram illustrating an example reflective image capture system including compensation for refraction according to Snell's law, consistent with several embodiments of the present disclosure.

For the sake of simplicity of explanation, FIG. 1 has disregarded the effects of refraction; light rays such as 121, 122 and 123 are drawn to pass through different media without changing direction. While this depiction ignores Snell's law, the effects are omitted in order to better explain the core concept of the present disclosure. Further, so long as the distance which light will traverse through the various media (such as height z2 142 of water 102) are known, the impact of Snell's law on the calculations performed herein will be readily appreciated by one of ordinary skill in the art. A more physically accurate example, accounting for refraction, is depicted in FIG. 3.

Image capture device 108 may be utilized to monitor a position of an object 111 as it moves in three dimensions. Notably, image capture device may be a single image capture device, such as a single camera, etc. While FIG. 1 is a two-dimensional block diagram, horizontal position of object 111 (where "horizontal position" is defined as position within the X-Y plane) can be observed in the image plane of the image capture device 108. As will be shown, horizontal position is primarily relevant in terms of distance from the central axis 120 of image capture device 108. Thus, horizontal position is primarily discussed as a radial position r (i.e., the distance between a central point r0 150 located directly below the center of the image capture device and another point on the same horizontal plane as central point r0 150, where other example points on the same plane include r1 151, r2 152, r3 153; r0 150 is zero in the example depicted in FIG. 1). The height of image capture device (length of z3 143), a distance from image capture device 108 to reflective surface 107, may be known or otherwise directly measurable.

Figure 4:
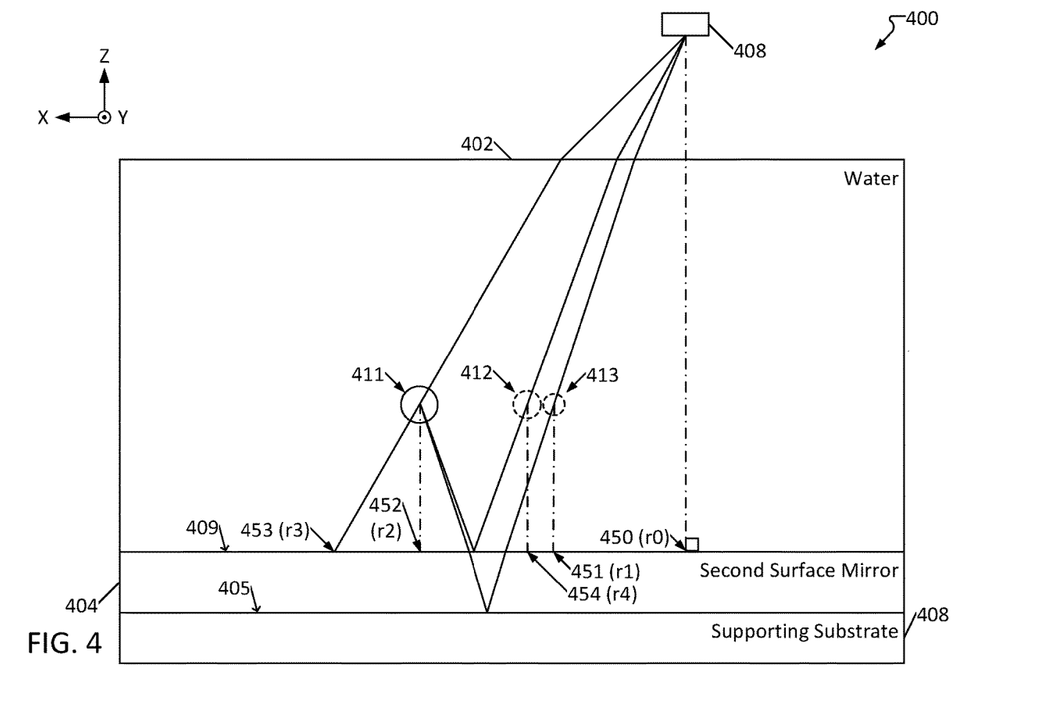
FIG. 4 is a conceptual diagram illustrating an example reflective image capture system utilizing a rear-surface mirror, consistent with several embodiments of the present disclosure.

Mirror 106 is a first-surface mirror, meaning reflective surface 107 is on the "outside" of the top surface (in system 100, the surface at the largest z-position); typical mirrors have a reflective surface on the bottom surface encased beneath and protected by a layer of transparent material, such as glass. As glass (or another similar medium) itself can produce a faint reflection, first surface mirrors may be preferred. FIG. 4 depicts an embodiment including a more traditional "second-surface mirror."

Image capture device 108 is oriented along a "camera axis" 120 along which capture device 108 captures images as described herein. In FIG. 1, camera axis 120 is parallel to the Z-axis (and perpendicular to the reflective surface 107 of mirror 106). However, in some embodiments, camera axis 120 may not necessarily be perpendicular to reflective surface 107, so long as the angle is known. While this may complicate calculations, the resulting displacements of virtual image 112A and reflected image 112B can still be accounted for.

r3 153 represents the apparent radial position (from the perspective of image capture device 108) of object 111. As object 111 translates in the X-Y plane, r3 153 will change accordingly. Its true radial position, r2 152, may be calculated in a number of different ways, as will be described in further detail below. Light reflected (or emitted) from object 111 may reach image capture device 108 through two primary paths: a direct path via light ray 121 and an indirect path via light ray 123 and its reflection, light ray 122. Ray 123 is reflected (as ray 122) from reflective surface 107 at a radial position r1 151. Direct light ray 121 makes an angle θ1 131 with camera axis 120, while reflected ray 122 makes an angle of θ2 132 with camera axis 120. Due to the reflection, a virtual image of object 111 (virtual image 112A) is apparent to image capture device 108. Due to image capture device 108's monoscopic perspective, virtual image 112A can also be represented by reflected image 112B, appearing as a smaller "copy" of object 111 at the same height z1 141. Reflected image 112B can be particularly useful for purposes of calculating height z1 141.

r1 151, the observed radial position of the reflected image 112B, can be combined with r3 153 and z3 143 to determine z1 141, the height of object 111 from reflective surface 107 according to Equation 1:

$$z1 = z3*(r3-r1)/(r3+r1) \tag{1}$$

This can be particularly advantageous, for example, for monitoring behavior in embodiments where object 111 is a life form such as an organism. For example, in some embodiments, image capture device 108 may be embedded within a microscope above a microscope slide, within which object 111 may be a microorganism. In some embodiments, image capture device 108 may be a camera mounted above an aquarium, within which object 111 is a fish or other creature. Object 111 is also not limited to an organism; systems and methods consistent with the present disclosure can be utilized to monitor a 3D position (and thus movement) of inorganic materials as well. For example, in some embodiments, object 111 may be a floating marker, enabling system 100 to monitor fluid flow in three dimensions within medium 102 (by observing motions of the marker).

While FIG. 1 depicts a glass slide 104 (which would also require refraction corrections), in some embodiments medium 102 may be uncovered. Biological specimens viewed under a microscope may typically be covered with a thin piece of glass (such as glass slide 104) to control sample water thickness (z2 142). If not, a drop of water introduces a curved surface. However, under magnification, typically only a small section of the surface is viewed, to the point where impact of the curve of the drop of water is negligible and the surface height can be substantially treated as constant. Thus, in some embodiments, medium 102 may be considered to have a flat upper surface (for example, a max-z surface of medium 102 may be considered parallel to the X-Y plane). In "macro" embodiments (such as observing an aquarium), a cover such as glass slide 104 may be more useful to mitigate effects of surface ripples.

Figure 2:
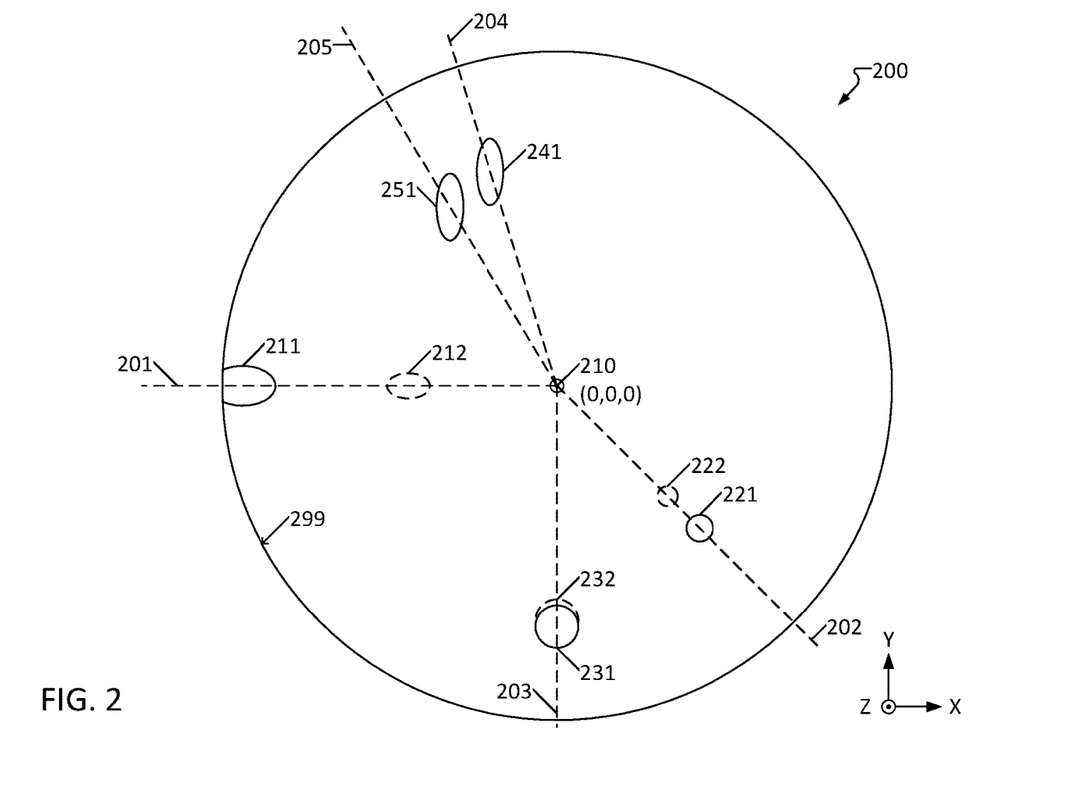
FIG. 2 provides a plan view of an example image captured by a reflective image capture system depicting objects and their reflections, consistent with several embodiments of the present disclosure.

FIG. 2 provides a plan view of an example image 200 captured by a reflective image capture system depicting objects and their reflections, consistent with several embodiments of the present disclosure. Image 200 may be captured by, for example, image capture device 108 of FIG. 1. Image 200 is centered on a camera axis 210 (parallel to the Z-axis) and depicts objects above a reflective surface (such as a mirror). As shown in FIG. 2, image 200 depicts entities (such as objects 211, 221, 231 as well as their reflected images 212, 222 and 232, respectively). Circumference 299 represents the largest field of view of objects detected by the system. Objects 241 and 251 are also depicted in image 200, but have no visible reflected images. Reflected images 212, 222 and 232 are depicted in FIG. 2 with dashed outlines to distinguish them from objects 211, 221, 231, 241 and 251, although their nature as reflected images may not be inherently obvious particularly because reflected images 232, 242 and 252 will depict the underside of their respective objects.

FIG. 2 illustrates several important properties of objects and their reflections when viewed from above a reflective surface. Notably, each object's reflection is situated along a same radial axis (originating from the origin) as the originating object. For example, object 211 and object 211's reflected image 212 are situated along radial axis 201, both object 221 and object 221's reflected image 222 are centered along radial axis 202, both object 231 and object 231's reflected image 232 are centered along radial axis 203, etc. Notably, object 241 and object 251 have no visible reflected images in FIG. 2, although radial axes 204 and 205 are still depicted in FIG. 2 (and utilized for searching, as will be described in further detail below).

In addition, as can be seen from Equation (1) as discussed with reference to FIG. 1, a distance between an object and its reflection depends upon several factors: a distance of the object from the reflected surface (object height), a radial distance of the object from the origin, and a distance of the image capture device above the reflective surface (camera height). These factors are depicted in FIG. 1 as z1 141, r2 152 and z3 143, respectively. While r2 152 generally cannot be observed directly based on an image such as image 200, it can be calculated from r3 153, z3 143 (both of which can be directly observed), and z1 141 (calculated via Equation 1) according to Equation 2:

$$r2 = z1*(r1/z3)+r1 \qquad (2)$$

If desired, the radial positions can be converted back to cartesian coordinates (X,Y,Z) according to known methods (e.g., r2 is the square root of (x2^2+y2^2), etc.). Due to this, it can be seen in FIG. 2 that, for example, object 231 is at a lower height than object 211 (because reflected image 232 is nearly overlapping with object 231, while reflected image 212 is a visibly greater distance from object 211). Further, objects 241 and 251 are likely very near or directly upon the reflective surface, as they have no visible reflections in image 200. As object 221 is closer to its reflected image 222 than object 211, it may be inferred that object 221 is at a lower height, but object 221 is also closer to the origin than object 211; both of these factors can contribute to the smaller distance between object 221 and reflected image 222. As the objects move, their reflected images will also move (or become/no longer be visible). Monitoring the relative positions of the objects and their reflections can enable a system processing image 200 to track motion of the objects within three dimensions (the X-Y plane as well as height Z from the reflective surface). Notably, such a system does not need two image capture devices 108 or two sets of lens to receive stereoscopic or duplicate images; a single image capture device is sufficient.

FIG. 3 is a block diagram illustrating an example reflective image capture system 300 including compensation for refraction according to Snell's law, consistent with several embodiments of the present disclosure. Snell's law teaches that light bends towards a normal when entering a medium of higher refractive index and bends away from the normal when entering a medium of lower refractive index. As discussed above, FIG. 1 is depicted without accounting for refraction resulting from light rays travelling through different media for the sake of focusing explanation upon the core concept. This refraction is depicted in FIG. 3 instead. FIG. 3 depicts a medium 302 (such as, for example, water) spanning a distance z2 342 (e.g., from a reflective surface). In particular, light ray 321, originating from object 311, travels through medium 302 (such as water) at an angle (with the z-axis) of θ1 331. Upon exiting water 302, light ray 321 is refracted to a second angle θ2 332. This refracted light ray is labeled 322. FIG. 3 depicts the difference this refraction has upon the apparent location of object 311; without refraction, light approaching image capture device 308 at the same angle θ2 332 (depicted as light ray 323) would originate from object 313 (depicted with dashed lines because object 313 is an illusion). Thus, object 311 appears from image capture device's 308 perspective to be located at the position of object 313, with an observed radial distance of r3' 354 (a horizontal distance, meaning a distance in the X-Y plane, from the origin at r0 350).

As can be seen in FIG. 3, the reflected light ray 324 is similarly refracted (exiting medium 302 as a refracted light ray 325). Thus, object 311's reflection 312 would be shifted in a manner similar to that of object 311 (e.g., in the positive X-direction), although this is not depicted in FIG. 3 for simplicity.

However, due to Snell's law, this refraction can be countered simply based on knowledge of the media involved (and their dimensions). Snell's law is commonly described as n1 sin(θ1)=n2 sin(θ2), where "n" is a refractive index of a medium. For example, water (at 20° C.) has a refractive index of n=1.333, air has a refractive index of n=1.000271800 (at 20° C. and 1 atmosphere of pressure), borosilicate glass (commonly used for microscope slides) has an index of refraction of n=1.51446 and a vacuum has a refractive index of n=1. The index of refraction is temperature dependent, but the impact of changing temperature is negligible outside of extreme variations. For example, a 10° C. change in the temperature of water (20° C. to 30° C.) results in a 0.07% change in index of refraction. Thus, while monitoring of temperature may enable more accurate measurements, it may only be necessary for applications with extreme temperature variation.

In view of Snell's law, knowledge of the composition of 302 (which is discussed as water for exemplary purposes but may be another medium such as air) and a distance from image capture device 308 to medium 302 can enable one of ordinary skill in the art to account for the refractive effect and determine actual values for r3 353 and r1 351, thus enabling calculation of values such as r2 352 and the height of object 311. This correction can be performed via Equation 3:

$$r3 = z2 * \tan(\theta 1) \quad (3)$$

Where z2 342 is the height of medium 302 and θ1 is derived using the refractive indices according to Equation 4:

$$\theta 1 = \arcsin(\sin(\theta 2) * n\_environment / n\_medium) \quad (4)$$

Where n_environment is the refractive index of the external environment in which image capture device 308 is situated (e.g., air, although other possibilities are considered as well) while n_medium is the refractive index of medium 302. θ2 can be calculated according to Equation 5:

$$\theta 2 = \arctan(r3'/z2) \quad (5)$$

Notably, additional media may be utilized, such as the glass slide 104 depicted in FIG. 1. Light will be refracted in different ways through media with different refraction indices (as governed by Snell's law) each time the light passes from one medium to another. Thus, accounting for each medium through which the light passes, as well as its thickness, should increase the accuracy of calculations of an object's height with respect to the image-capture device.

FIG. 4 is a block diagram illustrating an example reflective image capture system 400 utilizing a second-surface mirror 404 (sometimes referred to as a rear-surface mirror), consistent with several embodiments of the present disclosure. Rather than the first-surface mirror 106 of FIG. 1, some embodiments may implement a second-surface mirror 404 with a reflective surface 405 "behind" a layer of relatively transparent medium, such as glass. Second-surface mirror 404 may have some advantages over first-surface mirrors and thus may be preferable in some embodiments. For example, the primary reflection 413 produced by second-surface mirrors is generated by light from an object (such as object 411 with apparent radial position r3 453) reflecting from a surface (405) that the object itself cannot reach. This means that, in many situations, object 411 and its primary reflection 413 will not overlap, even if object 411 is resting on a bottom surface of medium 402. Note that overlap is still possible; for example as object 411's radial distance (r2 452) from the origin (r0 450) approaches zero, object 411 and primary reflection 413 will approach each other (e.g., a difference between r2 452 and r1 451 will approach zero), eventually resulting in overlap. Second-surface mirrors have some additional advantages over first-surface mirrors. For example, they are more commonly available, less expensive and more durable as their reflective surfaces (such as reflective surface 405) is protected by the layer of relatively transparent material. This can reduce cost and improve durability and ease of manufacture/maintenance. In some embodiments, mirror 404 may be mounted on a supporting substrate 408, such as an opaque plate.

However, second-surface mirrors (such as mirror 404) have some drawbacks as well. For example, as second-surface mirrors include a medium (typically glass) covering the reflective surface (such as surface 405), this medium frequently casts a secondary reflection (such as secondary reflection 412) from the top surface (such as surface 409), albeit with a smaller intensity than the primary reflection (such as primary reflection 413) produced by the primary reflective surface (such as reflective surface 405). This is shown in FIG. 4 as primary reflection 413 and secondary reflection 412. The presence of multiple reflections may increase difficulty and/or decrease reliability of reflection detection; a system erroneously identifying secondary reflection 412 as object 411's "main" reflection may result in miscalculation of object 411's height, as secondary reflection 412 is at a different radial location (r4 454) than primary reflection 413 (which is at r1 451). Generally, reflections cast by sources other than reflective surface 405 will be noticeably fainter (possibly to the point of not appearing at all), so systems utilizing or otherwise compatible with second-surface mirrors will be capable of detecting and discounting such secondary reflections by performing exhaustive reflection searches along radial axes (such as axis 202 of FIG. 2) rather than selecting a first confirmed reflection. This will enable a system to discriminate the primary reflection 413 caused by reflective surface 405 from the secondary reflection 412 caused by the top surface 409 by selecting the reflection with the largest magnitude (e.g., the least transparent entity).

However, in some embodiments, a transparent material, for example a glass slide, without any reflective material added to a surface may be used as a second-surface mirror 404 as the lower surface causes a reflection as light passes through to the medium below. In this embodiment, the primary reflection 412 and secondary reflection 413 will both be of similar magnitude, albeit smaller magnitude then a material coated with a reflective surface. So long as the magnitude of the two reflections (primary reflection 413 and secondary reflection 412) are understood and the path of the light ray responsible for the reflection is known and understood (e.g., which media the ray traveled through and how thick they are), the height of object 411 can be calculated in much the same manner. In some embodiments, both secondary reflection 412 and primary reflection 413 may be utilized to calculate a height of object 411.

When using a second-surface mirror, the medium of the mirror itself must also be accounted for using Snell's law. For example, light rays responsible for primary reflection 413 refract upon entering mirror 404, re-entering medium 402, and again upon exiting medium 402 (assuming medium 402 and mirror 404 and the "external environment" in which image capture device 408 (for example, air) is positioned have different refractive indices).

Figure 5:
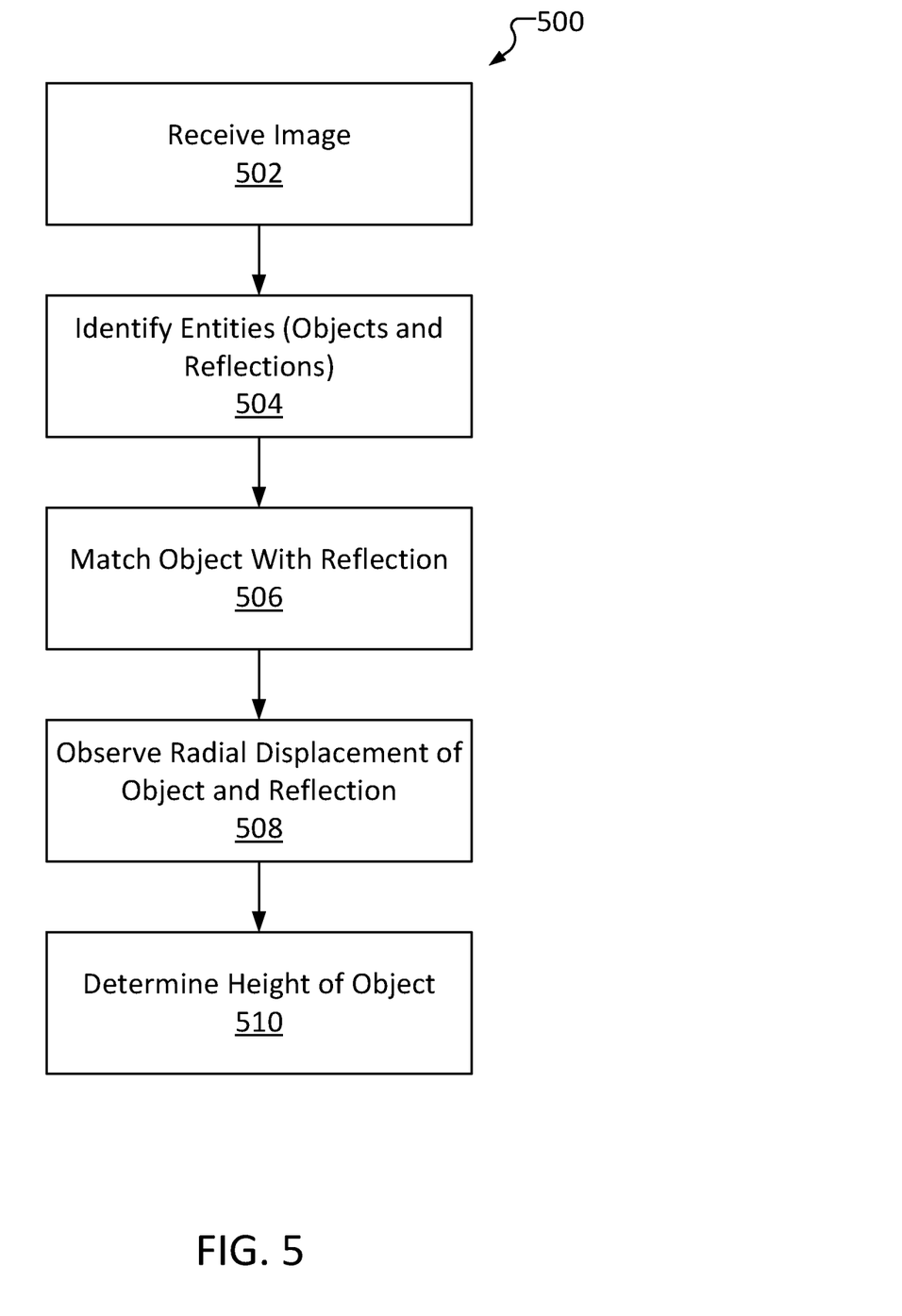
FIG. 5 is an illustrative method for determining a height of an object observed within a reflective image capture system, consistent with several embodiments of the present disclosure.

FIG. 5 is an illustrative method 500 for determining a height of an object observed within a reflective image capture system, consistent with several embodiments of the present disclosure. Method 500 may be performed by, for example, a system controlling an image capture device oriented toward a reflective surface such as, for example, image capture device 108 oriented toward front-surface mirror 106. Method 500 includes receiving an image at operation 502. Operation 502 may include, for example, receiving an image captured by an image capture device, such as a camera. Operation 502 may be performed in response to an input (such as a user depressing a button) or may be automatically performed (e.g., continuously performed, or performed according to a predetermined schedule, or the like).

Method 500 further includes identifying entities within the image at operation 504. Operation 504 may include, for example, performing one or more image analysis algorithms, such as image segmentation. As an example embodiment, operation 504 may include a process that partitions images into different regions, specifically "object" (or "entity") and "background." Operation 504 may include generating an entity list identifying, for each detected entity, coordinates of a bounding box that encompasses the detected entity (wherein "entities" include objects and their respective reflections). If the image is in color, it may be converted to grayscale. A median filter may be applied to the image to create uniform lighting across the image. A global quantization threshold may be applied to convert the grayscale image to a binary image (in which pixels are on or off). In some embodiments using a secondary mirror, the threshold may be set so only primary reflection 413 is detected, as the unwanted secondary reflection 412 from the top surface 409 is of lower magnitude. A dilation operation may then be applied to avoid adjacent objects from being detected as several objects, resulting in white objects against a black background. In some embodiments, operation 504 may include detecting entities via a known contour algorithm.

Method 500 further includes matching objects with corresponding reflections at operation 506. Operation 506 may include utilizing an autocorrelation method to match object-reflection pairs (or groups). For example, in some embodiments, a system performing method 500 may scan the list of detected entities radially inward, examining their bounding box coordinates, starting at an edge of the image (such as circumference 299 of image 200 of FIG. 2) and working towards the image center (e.g., center 210). A first detected entity may be marked as a real object and its filled outline may be saved as an object template. The template may then be correlated, using a 2D convolution, with objects in the list whose bounding box coordinates substantially align on a radial path towards the image center within a maximum radial distance, determined from the maximum expected height an object may exist above the reflective surface (such as, for example, the sample thickness z2 142 of medium 102 of FIG. 1). The 2D convolution may compare the template with each patch of pixels, producing a relatively larger output when the patch has a substantially similar shape to the template. The displacement that causes the largest signal may be determined to be the location of a primary reflection (such as primary reflection 413 of FIG. 4 or reflected image 112B of FIG. 1).

Method 500 further includes observing a radial displacement of the object and its matched reflection (if any) at operation 508. Operation 508 may include, for example, counting a number of pixels from the origin (which may be the center of the image) to a common point on both the object and its reflection (for example, the center of both entities, an outer edge, an inner edge, etc.). Referring back to FIG. 1 as an example, using the centers of object 111 and reflected image 112B as a common point, operation 508 may include identifying r3 153 and r1 151, respectively.

Method 500 further includes determining a height of the object at operation 510. Operation 510 may include, for example, calculating a distance from the reflective surface utilizing observed radial distances as well as a known height of an image capture device above the reflective surface. Height may be calculated utilizing Equation 1, as described above. In some embodiments, if a radial distance is determined to be zero (implying the object is directly underneath) and the image capture is a sequence of images, as in a video, the height may be estimated by interpolating the heights from the pair of images when the object enters and leaves the location directly underneath the image capture device.

With a height of an object known, one of a number of auto-focusing algorithms may be utilized to automatically focus a camera, as will be understood to one of ordinary skill in the art. Further, as the reflection(s) will depict an underside of the object while the image capture device will capture a top surface of the object, these can be leveraged to generate a composite image of the top and bottom views of the object.

Figure 6:
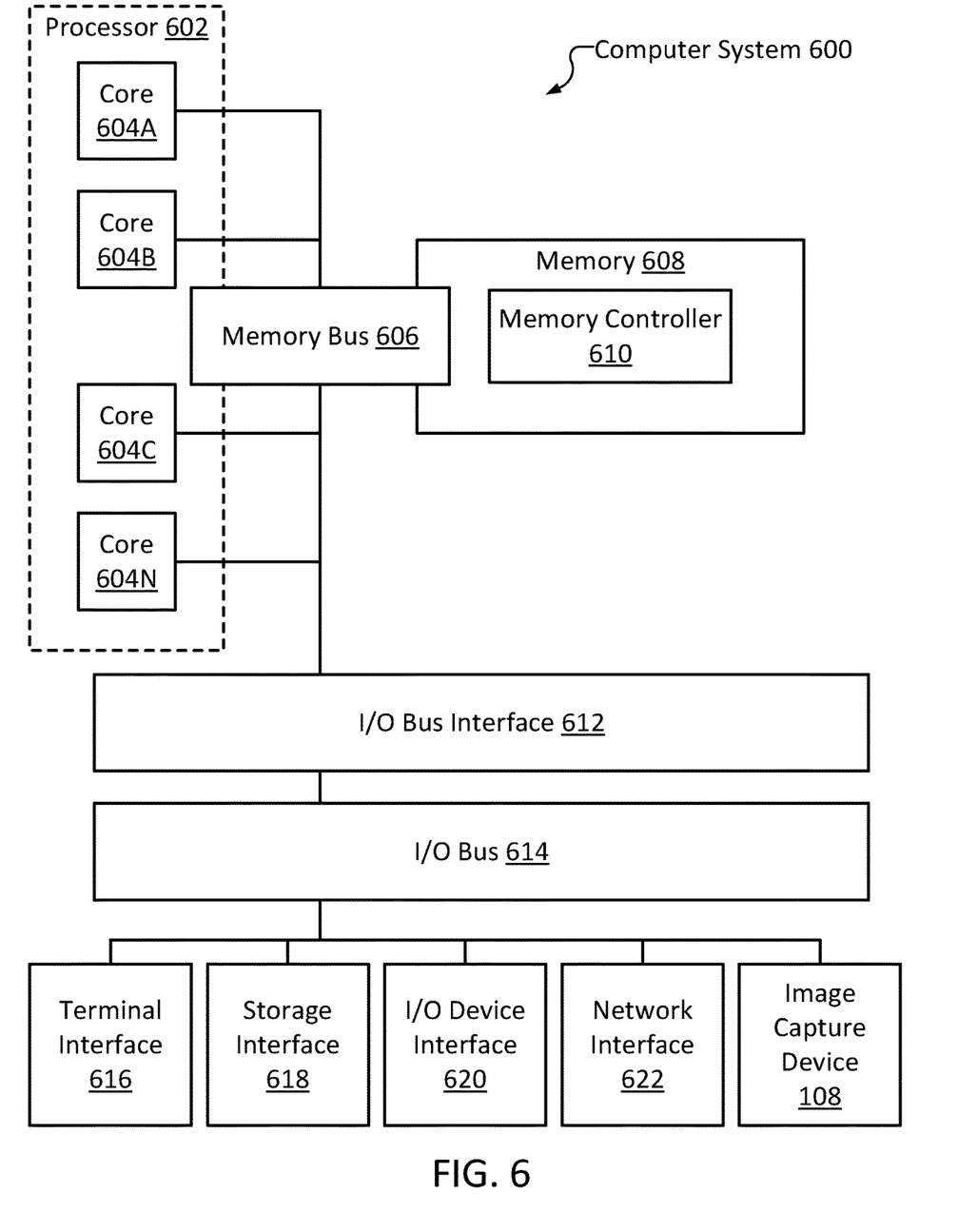
FIG. 6 illustrates a high-level block diagram of an example computer system that may be used in implementing embodiments of the present disclosure.

Referring now to FIG. 6, shown is a high-level block diagram of an example computer system 600 that may be configured to perform various aspects of the present disclosure, including, for example, method 500. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 608, a terminal interface 616, a storage interface 618, an I/O (Input/Output) device interface 620, an image capture device 108 and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable central processing units (CPUs) 602, some or all of which may include one or more cores 604A, 604B, 604C, and 604D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 608 on a CPU core 604 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 602. This may include a memory controller 610.

Although the memory bus 606 is shown in FIG. 6 as a single bus structure providing a direct communication path among the CPU 602, the memory subsystem 608, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus, comprising:
    an image capture device configured to capture images along a first axis;
    a reflective surface disposed at a first distance along the first axis from the image capture device, wherein the first axis is perpendicular to the reflective surface; and
    a first medium spanning a second distance along the first axis from the reflective surface between the image capture device and the reflective surface;
    a processor coupled to the image capture device, the processor configured to perform video analysis operations including:
        recording, using the image capture device, a real image of an object in the medium and a reflected image, from the reflected surface, of the object; and
        analyzing the real image and the reflected image to determine the position of the object within the medium.

2. The apparatus of claim 1, wherein the reflective surface comprises a first-surface mirror.

3. The apparatus of claim 1, wherein the reflective surface comprises a second-surface mirror.

4. A method, comprising:
    receiving an image from an image capture device;
    identifying a first entity in the image;
    identifying a second entity in the image;
    determining that the second entity is a reflection of the first entity;
    determining, based on the image, an apparent distance between the first entity and the second entity; and
    determining, based on the apparent distance and a first distance between the image capture device and a reflective surface, a second distance of the first entity from the reflective surface.

5. The method of claim 4, wherein:
    the first entity is suspended within a first substrate, the first substrate having a first refractive index and spanning a third distance along a first axis from the reflective surface, wherein the first axis is perpendicular to the reflective surface; and
    the second distance is determined based further on the first refractive index and the third distance.

6. The method of claim 4, further comprising controlling a focus of the image capture device based on the second distance.

7. The method of claim 4, wherein the identifying the first entity and the second entity is performed via image segmentation.

8. A system, comprising:
    an image capture device oriented along a first axis;
    a reflective surface disposed at a first distance along the first axis from the image capture device, wherein the first axis is perpendicular to the reflective surface;
    a processor coupled to the image capture device, the processor configured to perform video analysis operations including:
        receiving an image from the image capture device;
        identifying a first entity in the image;
        identifying a second entity in the image;
        determining that the second entity is a reflection of the first entity;
        determining, based on the image, an apparent distance between the first entity and the second entity; and
        determining, based on the first distance and the apparent distance, a second distance of the first entity from the reflective surface.

9. The system of claim 8, wherein:
    the first entity is suspended within a first substrate, the first substrate having a first refractive index and spanning a third distance along the first axis from the reflective surface; and
    the second distance is determined based further on the first refractive index and the third distance.

10. The system of claim 8, wherein the processor is further configured to control a focus of the image capture device based on the second distance.

11. The system of claim 8, wherein the second entity is a reflection of an underside of the first entity.

12. The system of claim 8, wherein the identifying the first entity and the second entity is performed via image segmentation.

13. A method of determining a position of an object, comprising:
    providing a reflective surface, the object moving within a medium near the reflective surface;
    recording, using a single image capture device, a real image of the object and a reflected image, from the reflected surface, of the object; and
    analyzing the real image and the reflected image to determine the position of the object within the medium.

14. The method of claim 13, wherein the medium is defined by a liquid through which the object moves.

15. The method of claim 14, wherein the object is a life form and the single image capture device acts as a microscope.

* * * * *